US 6,597,746 B1

(12) United States Patent
Amrany et al.

(10) Patent No.: US 6,597,746 B1
(45) Date of Patent: Jul. 22, 2003

(54) SYSTEM AND METHOD FOR PEAK TO AVERAGE POWER RATIO REDUCTION

(75) Inventors: Daniel Amrany, Wayside, NJ (US); Marc Delvaux, Eatontown, NJ (US); Richard Gut, Oberrflachs (SE); William H. Scholtz, Middletown, NJ (US)

(73) Assignee: Globespanvirata, Inc., Red Bank, NJ (US)

( * ) Notice: Subject to any disclaimer, the term of this patent is extended or adjusted under 35 U.S.C. 154(b) by 0 days.

(21) Appl. No.: 09/505,528

(22) Filed: Feb. 17, 2000

Related U.S. Application Data

(60) Provisional application No. 60/120,494, filed on Feb. 18, 1999.

(51) Int. Cl.[7] .......................... H04K 1/02; H04L 25/03; H04L 25/49
(52) U.S. Cl. .................. 375/296; 375/285; 708/300
(58) Field of Search ............................. 375/296, 254, 375/285, 229, 232, 350, 346; 708/300, 320, 314

(56) References Cited

U.S. PATENT DOCUMENTS 4,651,231 A * 3/1987 Douglas, Jr. ............... 386/95
6,081,820 A * 6/2000 Holowko .................... 708/300

* cited by examiner

*Primary Examiner*—Jean B. Corrielus
(74) *Attorney, Agent, or Firm*—Thomas, Kayden, Horstemeyer & Risley

(57) ABSTRACT

A system and method for performing peak-to-average power ratio reduction in a transmitter using pulse amplitude modulation (PAM) encoding. Broadly, a transmitter is configured to perform active digital filtering to detect encoded data symbols that if uncorrected would lead to relatively high analog signal peaks in the data transmission. A prediction is made of the peak values that would be applied at the digital to analog converter (DAC) if the original output of the Tomlinson precoder was sent into the shaping filter. If the absolute value of the predicted peak value exceeds a threshold, a correction of a full 2L step is applied for one sample of the Tomlinson precoded stream. The correction step is applied in such a way as to reduce the resulting peak output. Two methods of predicting the peak values are presented. The first method segments the shaping filter into causal and non causal portions so that no extra delay is introduced. The second method uses a two-stage approach where a first pass provides symbols without correction, then corrected symbols are injected in a duplicate modulation filter (this implies an extra delay equal to the filter delay). A variation of the two-stage approach takes advantage of the linear aspects of the Tomlinson preceding.

29 Claims, 6 Drawing Sheets

SYSTEM AND METHOD FOR PEAK TO AVERAGE POWER RATIO REDUCTION

CROSS-REFERENCE TO RELATED APPLICATION

The present application claims the benefit of U.S. provisional patent application, Ser. No. 60/120,494, filed Feb. 18, 1999, which is hereby incorporated by reference in its entirety.

TECHNICAL FIELD

The present invention generally relates to communication systems, and more particularly, to a system and method for peak to average power ratio reduction in communication systems using time domain techniques for data signal transmission. The present invention is particularly suited to transmitters that use pulse amplitude modulation (PAM) and Tomlinson preceding.

BACKGROUND OF THE INVENTION

In recent years, telephone communication systems have expanded from traditional plain old telephone system (POTS) communications to include high-speed data communications as well. As is known, POTS communications include the transmission of voice information, control signals, PSTN (public switched telephone network) information, as well as, information from ancillary equipment in analog form (i.e. computer modems and facsimile machines) that is transmitted in the POTS bandwidth.

Prompted largely by the desire of businesses to reliably transfer information over a broadband network, telecommunications service providers have employed DSL systems to provide a plethora of interactive multi-media digital signals over the same existing twisted-pair copper lines. The provision of asynchronous digital subscriber line (ADSL) systems, using discrete multi-tone (DMT) line coding, to customer premises has proliferated over recent years due to the increasing demand for high speed Internet access.

ADSL systems can be designed to operate over the same copper lines with either the POTS or a Basic Access Integrated Service Digital Network (ISDN-BA) service. ADSL systems are designed to transmit significantly more data in the downstream direction, that is, from the telecommunication service provider to the remote customer, rather than sharing the bandwidth as in a dual-duplex communication system. The ADSL configuration permits the concurrent transmission of multiple digital signals from the telecommunications service provider to a remote location, while providing an adequate bandwidth for the limited capacity required for data transmissions originating at the remote site.

High-Bit-Rate digital subscriber lines (HDSL) can be considered an extension of the DSL and ADSL systems. HDSL was developed as a dual-duplex repeaterless T1 technology. HDSL was designed to serve non-load telephone subscriber loops meeting the Carrier Serving Area (CSA) guidelines. Unlike ADSL systems, HDSL systems are designed to take advantage of the full data transmission capacity of a cable pair in both directions. It is important to note that ADSL systems use DMT modulation for data transmission. Conversely, HDSL systems use PAM, a broadband carrierless method, for data transmission.

In a basic HDSL DMT implementation, a HDSL transmission unit—central office (HTU-C) is configured to modulate and convert digital data for analog transmission from a central office downstream to a remotely located HDSL transmission unit—remote (HTU-R). Each end of the HDSL link configured at the end points of a CSA loop is provided a similarly configured HDSL transmission unit. It is important to note that the central office and remote designators for the two HDSL transmission units is for descriptive purposes only as both units are interchangeable with the remote (HTU-R) unit configured to receive the analog transmission sent from the HTU-C from the telephone line. The HTU-R demodulates the signals and applies error correction before delivering each of the reconstructed digital data signals to its intended device. Concurrently, the HTU-R transmits data from the remote location back to the HTU-C.

In HDSL, incoming data bits are first encoded in PAM symbols, then subjected to Tomlinson preceding to better match the exact characteristics of the line. The encoded and modified PAM symbols are then passed through a bandwidth shaping filter.

Constraints on the average transmitted power in communication systems vary according to the specific application. In DSL applications, constraints are imposed to limit the amount of interference, or crosstalk, radiated into neighboring receivers. Because crosstalk is frequency dependent, the constraint on average power may take the form of a spectral mask that specifies the magnitude of allowable transmitted power as a function of frequency. For example, crosstalk in POTS communication systems is generally caused by capacitive coupling and increases as a function of frequency. Consequently, to reduce the amount of crosstalk generated at a particular transmitter, the pulse shaping filter generally attenuates higher frequencies more than lower frequencies.

In addition to constraints on the average transmitted power, a peak power constraint is often imposed as well. This peak power constraint is important for the following reasons:

1. The dynamic range of the transmitter is limited by its line driver and its digital to analog converter (DAC). In particular, saturation of the line driver will "clip" the transmitted waveform. Similarly, signal magnitudes that exceed the dynamic range of the DAC will also "clip" the transmitted waveform.
2. Rapid fades can severely distort signals with high peak to average power.
3. The transmitted signal may be subject to other non-clipping induced non-linearities.
4. A major component of the total power consumption within a transmitter is consumed within the line driver, as line driver power consumption overwhelms the power consumed by digital signal processing. As a result, PAR reduction is important to decrease power consumption in the output line driver.

Peak to Average Power Ratio

The peak to average power ratio is defined as the ratio of the magnitude of the instantaneous peak power to the time averaged value of the power. In HDSL2 applications, the PAR is defined by the digital transmit shaping filter. The shaping filter is added in the modulation stage within the HTUs to shape the spectrum of the transmitted signal. The effect of a digital finite impulse response (FIR), often used as the shaping filter, can be analyzed by calculating the mean, the variance, and the peak value of the FIR filter output using random data as the FIR filter input. It can be shown that the worst case PAR is uniquely defined by the filter coefficients, $H_i$, as $$PAR = \frac{\Sigma |H_i|}{\sqrt{\Sigma H_i^2}} \qquad \text{Eq. 1}$$

This theoretical maximum is in fact almost never achieved, so it is typical to define the PAR at a given level of significance by defining an effective peak value Pe(s). Pe(s) is such that the probability that the absolute value of the voltage exceeds Pe is $10^{-5}$. It is also usual to present the negative cumulative probability of the absolute voltage Q(v), so that Q(Pe(s))=$10^{-5}$. Once Pe(s) is known, PAR(s) is simply Pe(s)/RMS.

Frequency Domain Techniques

Two frequency domain techniques have been proposed to reduce PAR in transmitted signals in communications systems, see e.g. J. Tellado and J. M. Cioffi. "Further Results on Peak-to-Average Ratio Reduction", ANSI T1E1.4 contribution number 98–252, San Antonio, Tex., Aug. 1998 and ETSI/ANSI TM6 contribution number TD15, Vienna, Austria, Sep. 21–25, 1998. The proposed techniques are repeated for each frame, or in other words, for each IFFT operation. The techniques may be summarized as follows:

1. Reserving a set of tones whose amplitudes are calculated either by linear programming or a simpler iterative procedure to minimize the PAR. It is significant to note that this proposal reduces the data rate which is unacceptable under HDSL communication standards.
2. Modifying the modulation scheme by permitting more than the minimal set of points in each QAM constellation. Typically, a constellation is replicated at integer multiples of a translation vector, so that one input data symbol may be mapped at different positions in the QAM plane. Under this proposal, constellation positions are selected to minimize the PAR either via an iterative or a linear programming procedure. It is significant to note that this proposal does not reduce the data rate, but results in an increase in the average power dissipated in the line driver.

Neither of the aforementioned frequency domain techniques is of much practical interest as linear programming solutions require excessive resources and the proposed iterative solutions would necessitate undesirable time delays. In addition, the first technique does not apply for broadband carrierless modulation schemes.

Time Domain Techniques

Minimizing transmitter power for a given data rate in a given bandwidth is a recurrent theme in designing communication systems. As such, a number of techniques have been developed. However, to date, PAR has been adjusted by modifying the modulation (or encoding) technique or by selecting a specific shaping filter.

SUMMARY OF THE INVENTION

Accordingly, it is desired to provide a system and method that efficiently, accurately, and timely reduces the peak to average power required in a transmission unit in a communications system using a broadband carrierless data transmission scheme.

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

The present invention provides a system and method for reducing the peak to average power in a transmitter designed to use a broadband carrierless modulation scheme. Briefly described, in architecture, the system can be implemented by introducing a comparator in a feedback loop of the causal portion of a digital shaping filter and introducing a correction signal in the feedback loop when the magnitude of encoded symbols exceeds a predetermined threshold. The corrected encoded signals may be processed by both the causal and residual portions of the digital shaping filter prior to digital to analog conversion. The system of the present invention is particularly suited to systems that use Tomlinson preceding.

In systems that use the Tomlinson preceding method for receiver correction, the PAR reducer may be inserted to further modify the encoded symbols prior to digital to analog conversion. A prediction may be made of the peak values that would be obtained if the original output of the Tomlinson precoder was proceesed by the shaping filter. If the absolute value of the predicted peak value exceeds a threshold, a correction of a full 2L step may be applied for one sample of the Tomlinson precoded symbol stream. The correction step is applied in such a way as to reduce the resulting peak output.

Because the receiver also uses a mod 2L demapper, no change is needed at the decoder in the receiver. As such, the PAR reducer of the present invention may be implemented as a transmitter only solution.

Two methods of predicting the peak values are presented, one splits the filter into causal and non-causal filter segments so that no extra delay is introduced in the process, the second method uses a two-pass approach where a first pass gives the exact values without correction, then the corrected values are injected in a duplicate modulation filter (this implies an extra delay equal to the filter delay). Note that an N-pass approach may be derived from the two-pass approach.

A variation of the two-pass approach takes advantage of the linearity of the system to estimate the correction. Since the modulation scheme is not completely linear, the variation of the two-pass implementation is an approximation of the other embodiments.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENTS

Figure 1:
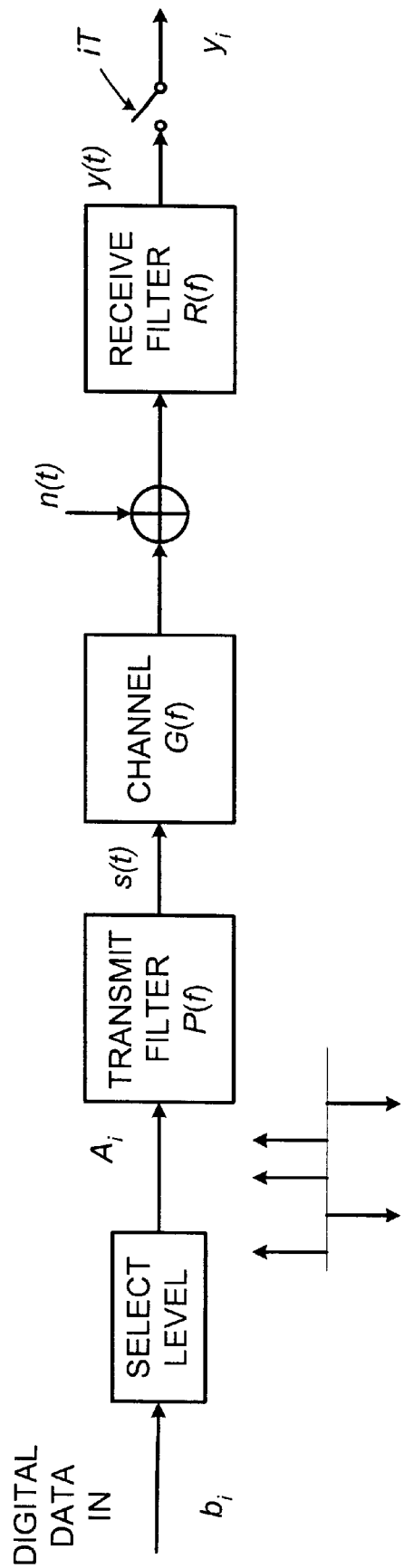
FIG. 1 is a diagram illustrating a pulse amplitude modulation (PAM) approach as may be applied on a transmission line.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

It will be apparent to one of ordinary skill in the art that the present invention can be applied across the spectrum of digital subscriber line (DSL) systems or other communication systems using time domain data transmission techniques. Turning now to the drawings, reference is made to FIG. 1, which illustrates a PAM approach to signal transmission along a transmission line.

In this regard, a PAM approach to data signal transmission may be implemented as follows. Source data bits from an input data stream may be mapped or encoded to a sequence of levels, $A_i$, which modulate the transmitter pulse p(t), the channel may be represented as follows:

$$s(t) = \sum_i A_i p(t - iT), \quad \text{Eq. 2}$$

where, p(t), is the impulse response of the transmitter pulse shaping filter shown in FIG. 1. The input to the pulse shaping filter is a modulated sequence of delta functions. The channel may be represented by a transfer function, G(f), plus noise, which has impulse response g(t). Similarly, the receiver may be represented by a transfer function, R(f), with an associated impulse response r(t).

H(t) may then be used to represent the impulse response of the combined transmitter, channel, and receiver as follows:

$$h(t)=p(t)*g(t)*r(t). \quad \text{Eq. 3}$$

Figure 2:
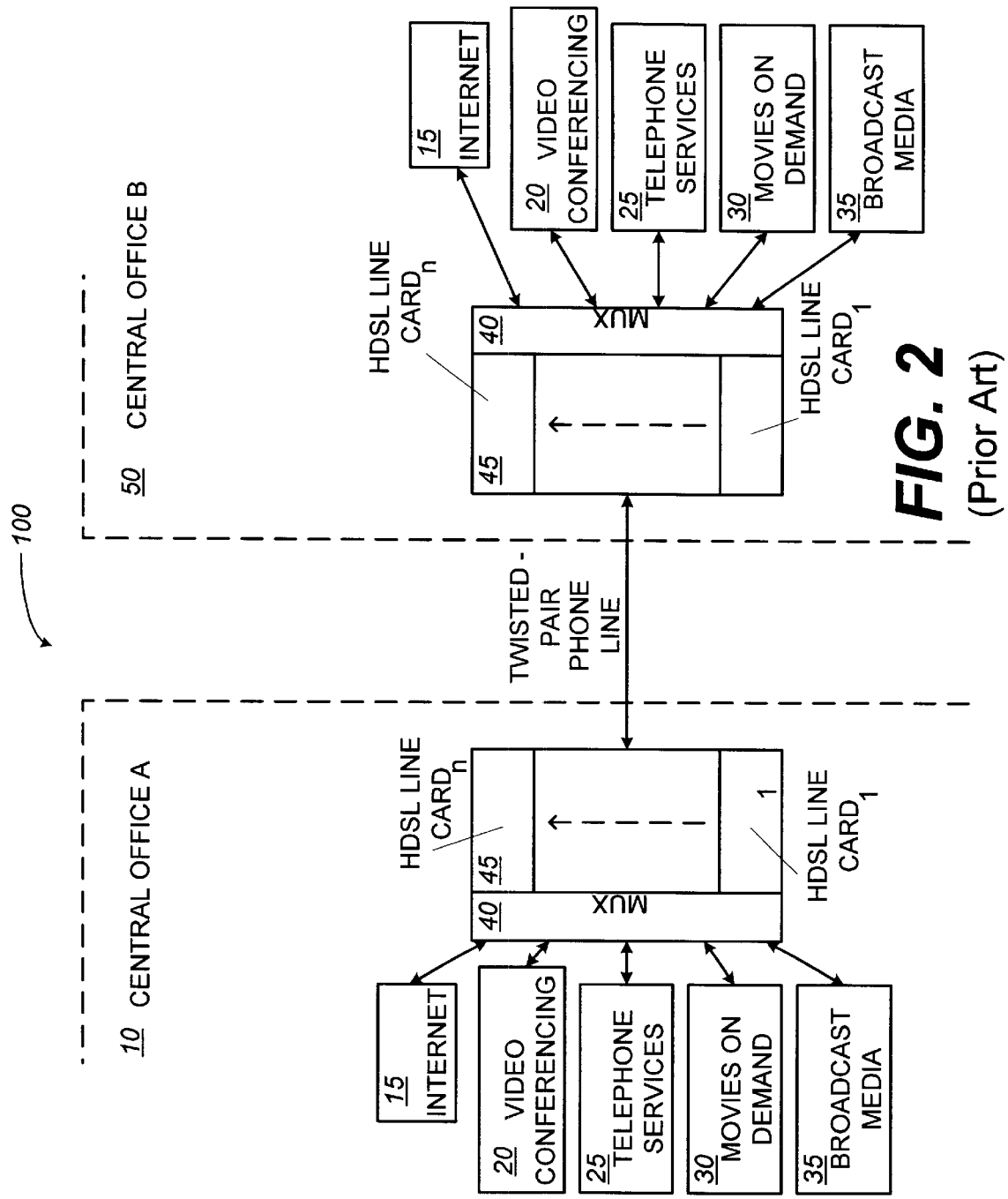
FIG. 2 is a block diagram illustrating delivery of multiple broadband services via a communications system on a twisted-pair telephone line.

Having briefly described a PAM approach to data transmission on a twisted-pair transmission line with regard to FIG. 1, reference is now directed to FIG. 2. In this regard, FIG. 2 is a block diagram illustrating delivery of multiple broadband services via a communications system on a twisted-pair telephone line. A HDSL to HDSL communication system 100 may deliver broadband data using a PAM data transmission scheme as illustrated and described in relation to FIG. 1 between central office A 10 and a second central office B 50. The delivery of broadband communication services via a HDSL to HDSL communication link over a twisted-pair copper line may be implemented as shown in FIG. 2. In this regard, a central office A 10 is configured to provide broadband services which it assembles via central office HDSL line cards 45 for transmission over a twisted-pair phone line to a second central office B 50. Examples of such broadband services are depicted as Internet 15, video conferencing 20, telephone services 25, movies on demand 30, and broadcast media 35. Central office A 10 assembles signals from the aforementioned broadband services via multiplexer (mux) 40 for appropriate transformation and transmission by one or more HDSL line cards 45.

Central office B 50 may comprise one or more compatible HDSL line cards 45 which process and distribute the several services previously described to appropriate destination devices such as another central office HDSL line card (not shown). Having briefly described a communications system that may use a PAM data transmission scheme in FIG. 2, reference is now directed to FIG. 3, which further illustrates the general structure of a HDSL transceiver.

Figure 3:
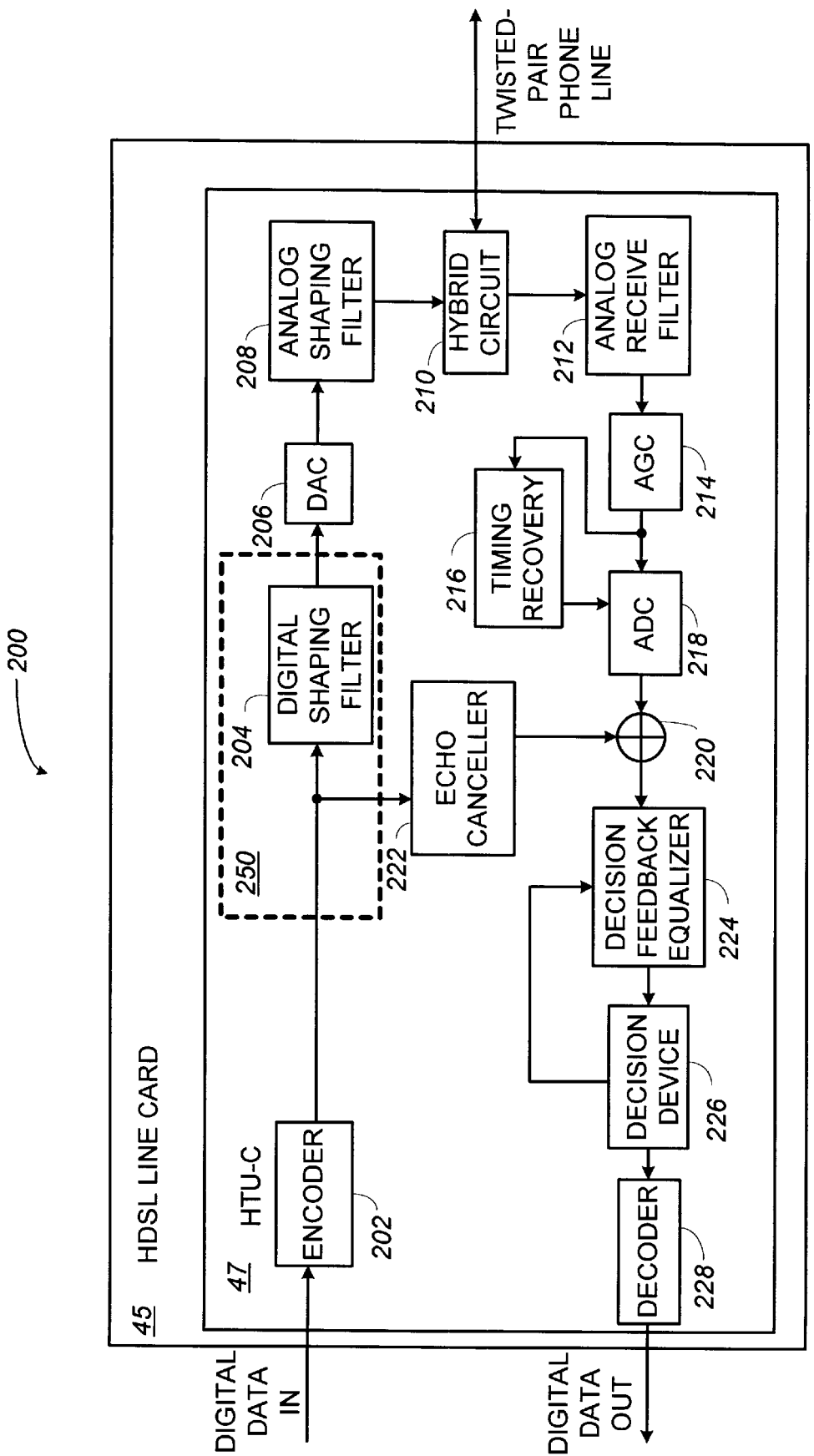
FIG. 3 is a functional block diagram further illustrating a HDSL transmission unit as may be deployed in the HDSL line card of FIG. 2.

As shown in FIG. 3, a HDSL transceiver 200 may be disposed within a HDSL line card 45 of FIG. 2 at either station in a two-station communication system. As further illustrated in FIG. 3, the HDSL line card may be described as a HTU-C 47. As illustrated in FIG. 3, a HTU-C 47 may comprise an encoder 202, a digital shaping filter 204, a digital to analog converter (DAC) 206, an analog shaping filter 208, and a hybrid circuit 210 in the upstream data path. Conversely, a HTU-C 47 may comprise a hybrid circuit 210, an analog receive filter 212, an automatic gain control amplifier (AGC) 214, a timing recovery circuit 216, an analog to digital converter (ADC) 218, an echo canceller 222, a decision feedback equalizer 224, a decision device 226, and a decoder 228 in the downstream data path.

In this regard, the upstream data transmission portion of a HTU-C 47 may function as follows. The bits of the digital data input signal may be encoded into a complex data symbol in encoder 202. The complex data symbols may be forwarded to a digital shaping filter 204 and an echo canceller 222. Digital shaping filter 204 may take the form of a finite impulse response (FIR) filter selected and used to shape the frequency spectrum across a particular HDSL communication channel. The output of the digital shaping filter 204 may then be forwarded to DAC 206. Having converted the digitally filtered complex data symbols representing the digital input data stream in DAC 206 to an analog signal, the analog representation of the digital data input stream may be further processed by an analog shaping filter 208. In this regard, analog shaping filter 208 may take the form of a Butterworth lowpass filter to control out-of-band energy present in the analog signal. The filtered transmit signal may then be coupled to the twisted pair telephone line via hybrid circuit 210. Hybrid circuit 210 may comprise two unidirectional ports (one for data transmission and one for data reception) and one bi-directional port. The bi-directional port may be integrated with the twisted-pair telephone line. If the impedance of the twisted-pair matches the design impedance of the hybrid, there will be perfect isolation between the transmitting and receiving ports within hybrid circuit 210. For this ideal case, the hybrid circuit 210 return loss is infinity. In reality, the line impedance is a variable of frequency and varies significantly between individual CSA loops.

Having briefly described the upstream functional operation of HTU-C 47, reference will now be directed to downstream data transmission within HTU-C 47. In this regard, a Butterworth low-pass filter may also be used for the analog receive filter 212. The function of the analog receive filter 212, like its counterpart in the transmission path of HTU-C 47 is to reduce out-of-band noise. Having removed the low-frequency out-of-band noise in the analog receive filter 212, the filtered analog data stream may be forwarded to the AGC 214. AGC 214 may be necessary to bring the received signal magnitude to that close to the normal transmit signal level for subsequent digital conversion and processing. Having adjusted the magnitude of the received signal in AGC 214, the filtered and amplified receive signal may be processed through a timing recovery circuit 216. Timing recovery circuit 216 typically coordinates the sampling clocks used to process data in both DAC 206 in the upstream data path, as well as, ADC 218 in the receive data path. ADC 218 may be synchronized to the DAC 206 through the timing recovery circuit 216 such that upstream and downstream data symbols are synchronized within the HTU-C 47.

Once the received data has been converted to a digital data stream in ADC 218, digital signal processing of the complex data symbols encoded within the received signal path may be processed. After analog to digital conversion, the output of the echo canceller 222 from the upstream data path may be mathematically combined with the received signal. The combination may take place in summer 220.

Echo canceller 222 may be designed to resemble the equivalence of the echo path as defined by both the digital and analog shaping filters 204, 208, the DAC 206, the hybrid circuit 210, the analog receive filter 212, the AGC 214, the timing recovery circuit 216, and the ADC 218. Possible phase jitter between the transmit signal and the received signal may be reduced by bit stuffing as defined by the HDSL frame structure. In typical configurations, the echo path transfer function is identified with an adaptive signal processing algorithm.

The digitized and echo-canceled received signal may be further filtered by decision feedback equalizer 224 before being forwarded to a decision device 226. The decision feedback equalizer 224 may comprise a feed-forward filter and a feedback filter. The feed-forward filter equalizes the precursor of the CSA loop channel impulse response, while the feedback filter cancels the effect of the post-cursor of the channel impulse response. The decision feedback equalizer is necessary for the HTU-C 47 to maintain minimal noise enhancement during the channel equalization process. Decision device 226 may take the form of a threshold detector configured to correspond to the discrete voltage levels used by the line code. After signal processing in the decision device 226, received symbols are converted back into signal bits in decoder 228 to create a digital data bit stream.

PAR Reduction Using a Prediction Filter

Figure 4:
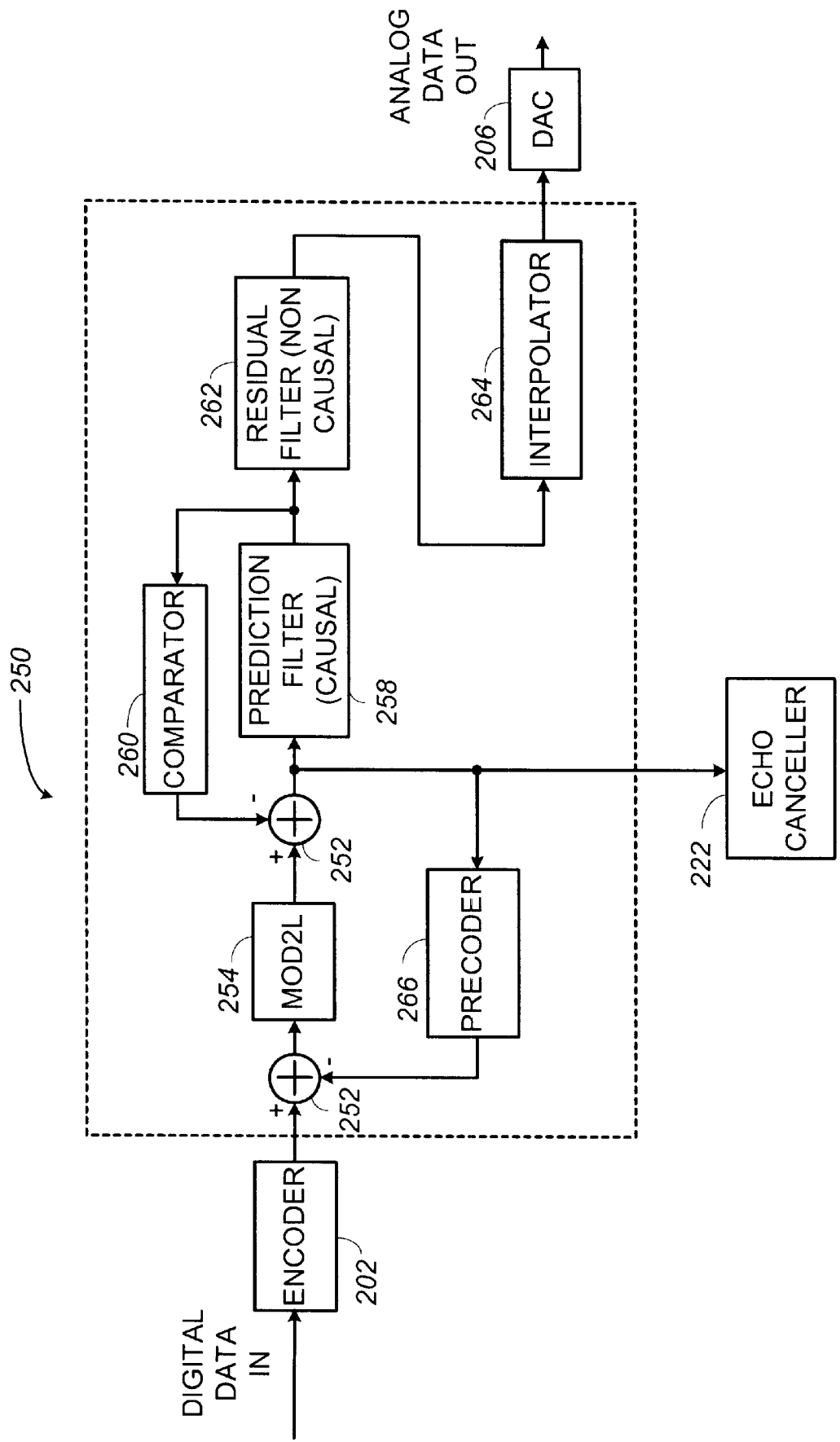
FIG. 4 is a functional block diagram illustrating an active PAR reducer implemented with a prediction filter.

Having described both the upstream and downstream processing paths through a HDSL transceiver 200 as illustrated in FIG. 3, reference is now directed to FIG. 4. In this regard, FIG. 4 is a functional block diagram illustrating an active PAR reducer implemented with a prediction filter.

As illustrated in FIG. 3 and FIG. 4, the PAR reducer 250 may be disposed within HTU-C transceiver 200 between the encoder 202 and the DAC 206 in the upstream or transmit data path. As illustrated in FIG. 4, the PAR reducer 250 may comprise a plurality of summers 252, a mod2L 254, a prediction filter 258, a comparator 260, a residual filter 262, an interpolator 264, and a precoder 266.

The PAR reducer 250 illustrated in FIG. 4 is particularly suited for operation in multi-carrier transmitters that use Tomlinson preceding. Tomlinson preceding provides a method for minimizing errors propagated in receivers that use a decision feedback equalizer 224. In Tomlinson preceding, the feedback filter in the decision feedback equalizer 224 (see FIG. 3) is moved into the upstream (transmit) data path to filter the original encoded data symbols. In addition, a modulo operation is used in the feedback loop to make the filtering operation stable. Without the modulo operation in the feedback loop, the feedback filter within the feedback equalizer would behave like a recursive filter which might become unstable given some value of transmit filter coefficients. Another modulo operation is performed after the feed-forward filter in the decision feedback equalizer of the receiver to restore the original signal magnitude. The modulo correction of +/−2L has the effect of limiting the output signal to the magnitude range of the original input data signal after processing by the feedback filter. The choice of the correction steps may be seen as an optimization problem that could theoretically be solved by linear programming techniques. These ideal techniques are not suitable to real time solutions, so less complex solutions are necessary.

Signal magnitude expansion at the transmitter in a Tomlinson precoded transceiver is limited by the duo-modulo operation (designated herein as mod2L) in the feedback loop. However, the signal magnitude expansion caused by the channel remains. The duo-modulo operation in a Tomlinson precoded transceiver makes the modulo operation transparent under channel distortion conditions. Unfortunately, the received signal before a decision device 226 (see FIG. 3) is typically not constrained to the maximum and minimum levels of a particular line code. Receiver front-end noise can cause the received signal to exceed signal symbol maximum and minimum levels. If this receiver front end noise error is not preserved and used to correct data symbol estimate decisions, data flipping may occur. Data flipping occurs when a data symbol corresponding to the maximum signal level is mistaken for a data symbol corresponding to the minimum signal level because additive noise caused the received signal to exceed the maximum level and the modulo operation adjusted the signal level to the minimum signal level.

As previously described, the Tomlinson preceding method may be implemented in the PAR reducer 250 of FIG.4 in the signal loop created by a first summer 252 disposed between the encoder 202 and the mod2L 254; the mod21 254; a second summer 252 disposed after the mod2L 254 and prior to prediction filter 258; and a precoder 266. The feedback loop is completed by coupling the output of precoder 266 to the first summer 252.

Having described the operation and implementation of a Tomlinson precoder, reference is now directed to the active filter portion of the PAR reducer 250 illustrated in FIG. 4. The active filter portion of the PAR reducer 250 may comprise the prediction filter 258, a residual filter 262, an interpolator 264, and a comparator 260.

It can be shown that a small number of coefficients when applied to the digital shaping filter 204 (see FIG. 3) are enough to predict if the final output data symbol will exceed a predetermined threshold. As a result, and as illustrated in FIG. 4, the complete digital shaping filter 204 may be segmented and the causal portion of the digital shaping filter 204 may be used as a prediction filter 258. If the output of the prediction filter 258 exceeds a given threshold as determined by the comparator 260, the current data symbol can be corrected before any other action is taken, e.g. before being used by precoder 266 and echo canceller 222. It is significant to note that the digital shaping filter is segmented, so that operations performed for the prediction are not lost during normal operation. Here, causal means that part of the filter right of the maximum amplitude coefficient.

Having used the causal portion of the segmented digital shaping filter to predict when data symbols will exceed a predetermined threshold and subsequently correcting the outlying data symbols prior to precoding and echo cancelling, further digital processing may be performed. In this regard, that portion of the digital shaping filter 204 (see FIG. 3) not used in the prediction filter 258 may be implemented as a residual filter 262 in the upstream data path. Optionally, an interpolator 264 may be added after digital shaping to insert symbols not derived from actual data points in the input bit stream to increase the sampling rate of the digital data stream that may be applied to the DAC 206.

Figure 5:
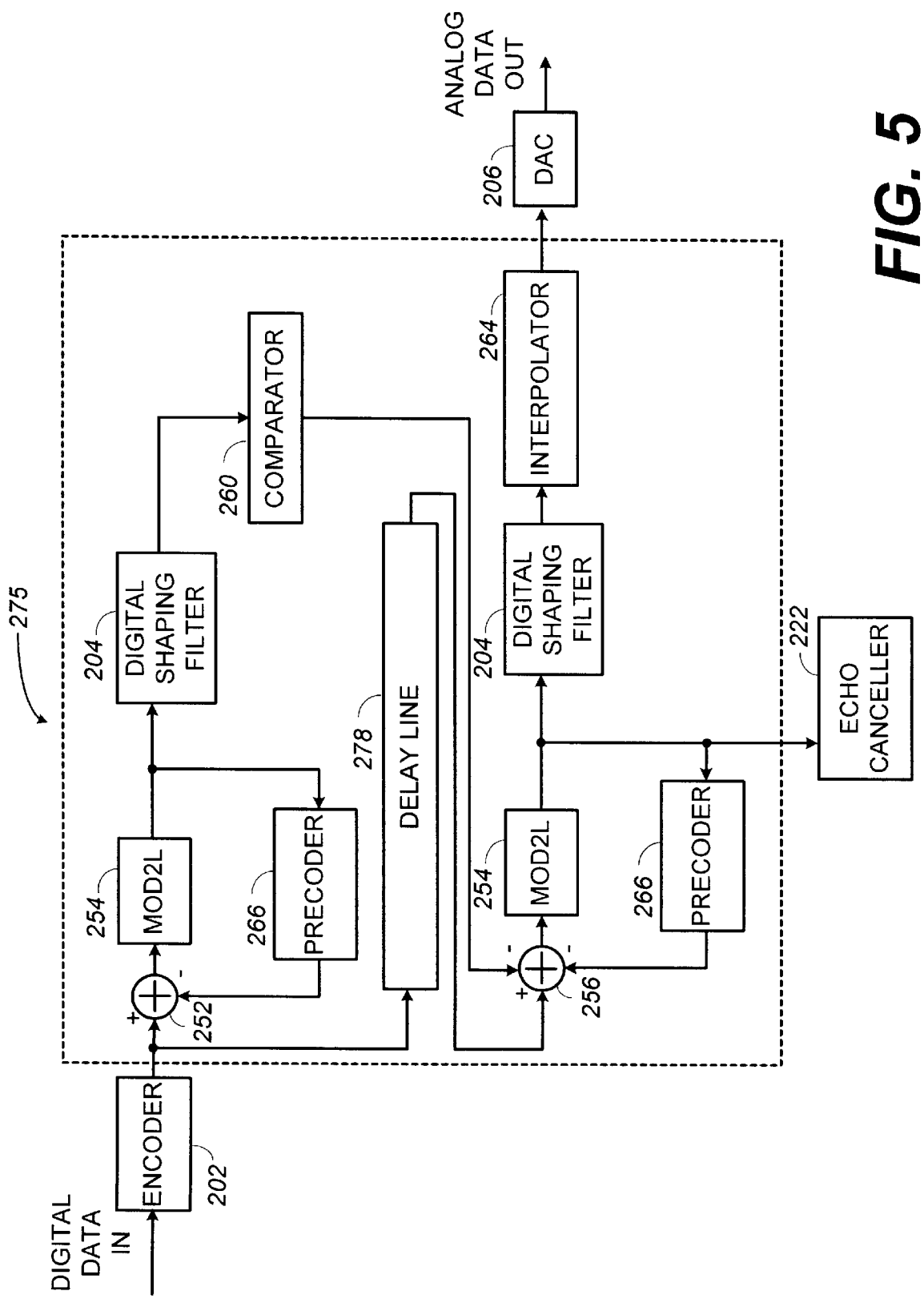
FIG. 5 is a functional block diagram illustrating the implementation of a two-stage PAR reducer.

Having described the operation of a PAR reducer 250 as illustrated in FIG. 4, reference is now directed to FIG. 5 which introduces a functional block diagram illustrating the implementation of a two-stage PAR reducer 275.

In this regard, a two-stage PAR reducer 275 may comprise a first-stage comprising a Tomlinson precoder signal processing loop, a digital shaping filter 204, and a comparator 260. The second stage of the two-stage PAR reducer 275 may comprise a Tomlinson precoder signal processing loop, a digital shaping filter 204, and an interpolator 264. The two stages of the PAR reducer 275 may be coupled by a delay line 278.

In this second embodiment of a PAR reducer, the digital shaping filter 204 in total is implemented as a prediction filter. For those data symbols present in the digitally shaped output signal that exceed a predetermined threshold in comparator 260, a correction is applied to the input of the two-stage PAR reducer 275. In this embodiment, the original data must be sampled and delayed by delay line 278 (configured to track the impulse delay of the digital shaping filter 204 and the processing delay in the comparator 260) to permit proper insertion of corrected data symbols within the digital data stream. It is important to note that because of the duplicative nature of the functional elements as illustrated in the two-stage PAR reducer 275 of FIG. 5 that a single instance of the same functional element may be operated in a time multiplexing fashion on different inputs in order to implement the PAR reducer 275. It is also important to note that an N-pass approach may be easily derived from the multi-stage approaches illustrated in FIG. 4 and FIG. 5. Such a N-pass approach may be derived by one skilled in the art and is consistent with the concepts of the PAR reducer of the present invention.

Linear Approximation PAR Reducer

Figure 6:
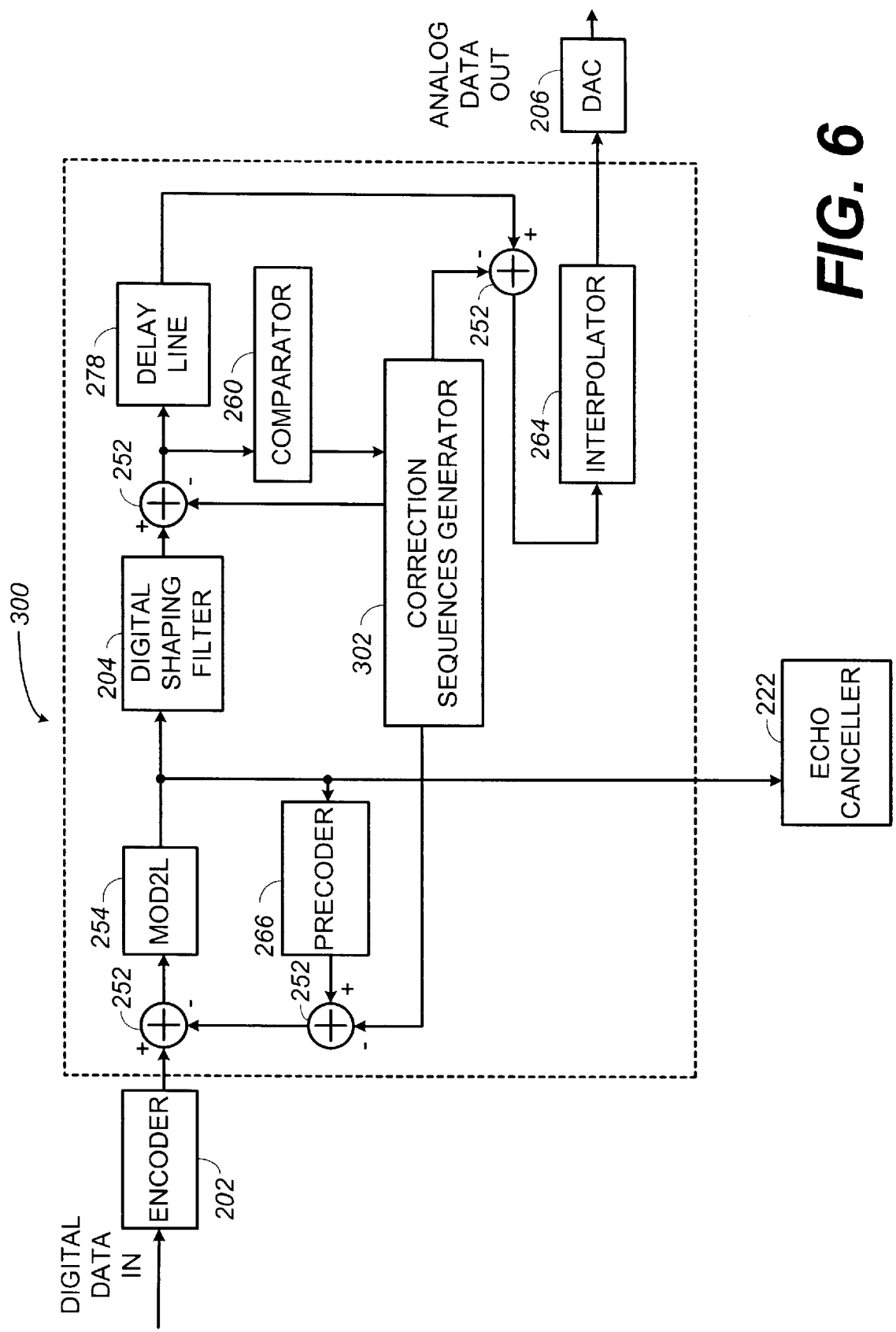
FIG. 6 is a functional block diagram illustrating a full hindsight PAR reducer.

Having described the operation of two embodiments of a PAR reducer 250 and 275 in regards to FIG. 4 and FIG. 5, reference is now directed to a linear approximation PAR reducer as illustrated in FIG. 6. This third embodiment of a PAR reducer may be designed to take advantage of the nearly linear duo-modulo operation performed in the Tomlinson precoder.

In this regard, the full hindsight PAR reducer 300 may comprise a Tomlinson precoder signal processing loop, a digital shaping filter 204, a plurality of summers 252, a delay line 278, a comparator 260, a correction sequences generator 302, and an interpolator 264. As previously described in connection with the PAR reducer 275 illustrated in FIG. 4, a Tomlinson precoder signal processing loop may comprise a first summer 252 disposed between the encoder 202 and the input to mod2L 254; the mod2L 254; a precoder 266 disposed after the mod2L 254 and prior to a second summer 252. The second summer 252 may be disposed at the output of the precoder 266 and a precoder correction output signal generated by the correction sequences generator 302. The feedback loop may be completed by coupling the output of the second summer 252 to an input of the first summer 252 as illustrated.

The linear approximation PAR reducer 300 may be implemented as follows. A digital data stream of Tomlinson precoded data symbols may be injected at the input to the digital shaping filter 204. The resulting data stream at the output of the digital shaping filter 204 may be sorted in absolute value. Data symbols that exceed a predetermined threshold applied in comparator 260 may be identified and corrected in the correction sequences generator 302.

The correction sequences generator 302 may be configured to provide correction sequences corresponding to the negated impulse responses of the uncorrected system if a 2L impulse was injected after mod2L 254. A precoder correction sequence may be forwarded as a feedback signal to the second summer 252 coupled to the output of the precoder 266. A causal correction sequence may be forwarded as a feedback signal coupled to the third summer 252 further coupled at the output of the digital shaping filter 204. A third non-delayed correction sequence may be forwarded by the correction sequences generator 302 to the input at a fourth summer 252, the fourth summer further coupled to the output of the delay line 278. The three correction sequences may be configured after application of each of the impulse corrections as injection of a correction sequence is the equivalent of providing the impulse response corresponding to the correction sequence in the three locations where correction is applied. The correction sequences are predictable and may be implemented by storing them in read only memory (ROM).

As previously described in connection with the PAR reducer 250 of FIG. 4, an optional interpolator 264 may be added after digital modulation processing to insert symbols not derived from actual data points in the input signal bit stream to increase the sampling rate of the encoded signals that may be applied to the DAC 206.

It is important to note that the modulation scheme is not completely linear. The duo-modulo operation is non-linear, but a good approximation, as it is piecewise linear. As a result, the PAR reducer 300 is an approximation of the previously introduced embodiments.

The embodiments discussed herein were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

Therefore, having thus described the invention, at least the following is claimed:

1. A method for reducing the peak to average power ratio of an encoded digital signal comprising:

inserting a two-stage digital filter coupled at the output of an encoder and the input of a digital to analog converter-in a transmitter, the two-stage digital filter having a first-stage and a second-stage;

processing an encoded symbol in the first-stage of the digital filter to create a correction signal, the correction signal responsive to the magnitude of the encoded symbol, the correction signal configured to reduce the magnitude of the encoded symbol; and applying the correction signal in a feedback loop at the input to the first-stage of the digital filter.

2. The method of claim 1, wherein the first-stage of the two-stage filter is the causal portion of a digital shaping filter.

3. The method of claim 1, wherein the second-stage of the two-stage filter is the non-causal portion of a digital shaping filter.

4. The method of claim 1, wherein the two-stage digital filter is a segmented finite impulse response (FIR) filter.

5. The method of claim 1, wherein the two-stage filter is implemented by time domain multiplexing a first input signal coupled to the output of the encoder through a first digital shaping filter with a second input signal comprising a delay of the output of the encoder, wherein a corrected and filtered first input signal is combined with the second input signal for further processing through a second digital shaping filter.

6. The method of claim 1, further comprising:
    coupling the output of the first-stage of the two-stage filter to the input of the second stage of the digital filter;
    coupling the output of the second stage of the two-stage filter to an interpolator to insert data symbols not correlated to bits in the input data stream applied at the input of the encoder; and
    coupling the oversampled output of the interpolator to the input of the digital to analog converter (DAC).

7. The method of claim 1, further comprising:
    inserting a Tomlinson coding signal feedback loop between the output of the encoder and the input to the first-stage of the digital filter.

8. The method of claim 4, wherein the two-stage finite impulse response (FIR) filter is segmented with the first-stage comprising a minimum number of coefficients necessary to generate a filtered output data symbol capable of exceeding a predetermined threshold of a comparator.

9. A digital signal processor configured to apply the method of claim 1.

10. A method for reducing the peak to average power ratio of an encoded signal comprising:
    inserting a comparator at the output of a digital shaping filter, the comparator configured to generate a first control signal;
    inserting a correction sequences generator at the output of the comparator, the correction sequences generator configured to generate and apply a first correction sequence, a second correction sequence, and a third correction sequence in response to the magnitude of the first control signal;
    applying the first correction sequence at the input to the digital shaping filter;
    combining the second correction sequence with the output of the digital shaping filter;
    inserting a delay line at the output of the digital shaping filter, the delay line configured to generate a second control signal to adaptively delay processing of the encoded signal;
    combining the third correction sequence with the second control signal to generate a magnitude adjusted digital data output signal; and
    applying the magnitude adjusted digital data output signal to the input of a digital to analog converter to generate an analog representation of the digital data output signal.

11. The method of claim 10, wherein the digital shaping filter is a finite impulse response (FIR) filter.

12. The method of claim 10, wherein the step of inserting a comparator is accomplished with a comparator configured to identify when a data symbol exceeds a predetermined threshold.

13. The method of claim 10, wherein the step of applying the magnitude adjusted digital data output signal to a digital to analog converter is replaced by the following steps:
    coupling the digital data output signal to an interpolator to insert data symbols not correlated to bits in the input data stream applied at the input to of an encoder; and
    coupling the output of the interpolator to the input of the digital to analog converter (DAC).

14. A digital signal processor configured to apply the method of claim 10.

15. A system for reducing the peak to average power ratio in the line driver of a transmitter comprising:
    an encoder configured to convert a digital bit stream into an encoded output signal containing a plurality of data symbols;
    a prediction filter configured to generate a first control signal, the first control signal responsive to the impulse response of the data symbols;
    a comparator displaced in a feedback loop between the first control signal and the output of the encoder, the comparator configured to apply a first correction signal responsive to the first control signal when an encoded data symbol exceeds a predetermined threshold;
    a residual filter coupled to the first control signal configured to generate a filtered digital data symbol output signal; and
    a digital to analog converter configured to transform the digital data output signal into an analog representation of the digital bit stream.

16. The system of claim 15, wherein the prediction filter comprises the causal portion of a digital shaping filter.

17. The system of claim 15, wherein the residual filter comprises the non-causal portion of a digital shaping filter.

18. The system of claim 15, wherein the prediction filter and the residual filter comprise a segmented finite impulse response (FIR) filter.

19. The system of claim 15, further comprising:
    a Tomlinson coding feedback loop coupled at the output of the encoder and the input to the prediction filter.

20. The system of claim 15, wherein the prediction filter comprises a finite impulse response (FIR) filter with a minimum number of coefficients necessary to generate a filtered output data symbol capable of exceeding the predetermined threshold of the comparator.

21. The system of claim 15, further comprising:
    an interpolator coupled at the output of the residual filter and the input to the digital to analog converter (DAC), the interpolator configured to insert data symbols not correlated to bits in the digital bit stream applied at the input of the encoder.

22. The system of claim 19, wherein the Tomlinson coding feedback loop comprises:
    a duo-modulo operator configured to create a second control signal, the second control signal responsive to the magnitude of the data symbols at the output of the encoder; and
    a precoder displaced in a feedback loop between the duo-modulo operator and the encoded output signal, the precoder configured to filter complex data symbols in the second control signal.

23. A digital signal processor configured to perform the functions of the system of claim 15.

24. A system for reducing the peak to average power ratio in the line driver of a transmitter comprising:
    an encoder configured to convert a digital bit stream into an encoded output signal containing a plurality of data symbols;

a digital shaping filter configured to generate a first control signal, the first control signal responsive to the impulse response of the data symbols;

a comparator displaced in a feedback loop between an output the digital shaping filter and the output of the encoder, the comparator configured to apply a first correction signal responsive to the first control signal when an encoded data symbol exceeds a predetermined threshold;

a delay line coupled at the output of the shaping filter;

a correction sequences generator coupled at the output of the comparator, the input to the shaping filter, the output of the shaping filter, and the output of the delay line, the correction sequences generator configured to inject a correction sequence in response to the first correction signal; and a digital to analog converter coupled to an output of the correction sequence generator, the digital to analog converter configured to transform a digital data output signal into an analog representation.

25. The system of claim 24, wherein the digital shaping filter comprises a finite impulse response (FIR) filter.

26. The system of claim 24, further comprising:

a Tomlinson coding feedback loop coupled at the output of the encoder and the input to the digital shaping filter.

27. The system of claim 24, further comprising:

an interpolator coupled at an output of the correction sequence generator and the input of the digital to analog converter (DAC), the interpolator configured to insert data symbols not correlated to bits in the digital bit stream applied at the input to the encoder.

28. The system of claim 27, wherein the Tomlinson coding feedback loop comprises:

a duo-modulo operator configured to create a second control signal, the second control signal responsive to the magnitude of the data symbols at the output of the encoder; and a precoder displaced in a feedback loop between the duo-modulo operator and the encoded output signal, the precoder configured to filter complex data symbols in the second control signal.

29. A digital signal processor configured to perform the functions of the system of claim 24.

* * * * *

UNITED STATES PATENT AND TRADEMARK OFFICE
CERTIFICATE OF CORRECTION

PATENT NO. : 6,597,746 B1
DATED : July 22, 2003
INVENTOR(S) : Amrany et al.

It is certified that error appears in the above-identified patent and that said Letters Patent is hereby corrected as shown below:

Title page,
Item [57], ABSTRACT, last word, after "Tomlinson", delete "preceding" and replace with -- precoding --

Column 1,
Line 19, after "Tomlinson", delete "preceding" and replace with -- precoding --

Column 2,
Line 16, after "Tomlinson", delete "preceding" and replace with -- precoding --

Column 3,
Line 12, after "is", delete "$10^{-5}$" and replace with -- $10^{-S}$ --
Line 14, after "Q(pe(s))=", delete "$10^{-5}$" and replace with -- $10^{-S}$ --

Column 4,
Lines 18-29, after "Tomlinson", delete "preceding" and replace with -- precoding --
Line 20, after "Tomlinson", delete "preceding" and replace with -- precoding --

Column 7,
Lines 61 and 63-64, after "Tomlinson", delete "preceding" and replace with
-- precoding --

Column 8,
Line 36, after "Tomlinson", delete "preceding" and replace with -- precoding --

Signed and Sealed this

Seventh Day of October, 2003

JAMES E. ROGAN
*Director of the United States Patent and Trademark Office*